United States Patent
Bi et al.

(10) Patent No.: US 11,365,653 B2
(45) Date of Patent: Jun. 21, 2022

(54) POWER GENERATION DEVICE AND METHOD USING ORGANIC WORKING FLUID FOR CIRCULATION WITHOUT PUMP AND VALVE

(71) Applicant: XI'AN JIAOTONG UNIVERSITY, Shaanxi (CN)

(72) Inventors: Qincheng Bi, Shaanxi (CN); Jinle Zhao, Shaanxi (CN); Fuqiang Huo, Shaanxi (CN); Tao Zhang, Shaanxi (CN)

(73) Assignee: XI' AN JIAOTONG UNIVERSITY, Shaanxi (CN)

( * ) Notice: Subject to any disclaimer, the term of this patent is extended or adjusted under 35 U.S.C. 154(b) by 0 days.

(21) Appl. No.: 17/173,190

(22) Filed: Feb. 10, 2021

(65) Prior Publication Data
US 2021/0189913 A1 Jun. 24, 2021

(30) Foreign Application Priority Data
Feb. 11, 2020 (CN) .......................... 202010087252.8

(51) Int. Cl.
*F01K 25/10* (2006.01)
*H02K 7/18* (2006.01)

(52) U.S. Cl.
CPC ............... *F01K 25/10* (2013.01); *H02K 7/18* (2013.01)

(58) Field of Classification Search
CPC .................................. F01K 25/10; H02K 7/18
See application file for complete search history.

(56) References Cited

U.S. PATENT DOCUMENTS

2011/0169277 A1\* 7/2011 Miller ..................... F01K 27/00
290/1 R

\* cited by examiner

*Primary Examiner* — Viet P Nguyen

(57) ABSTRACT

A power generation device and method using organic working fluid for circulation without pump and valve are invented, the principle is able to be called flash jet natural cycle. The flash injection tube, the magnetic sphere motion tube and the storage tank are connected to form the main loop. The finned tube and the storage tank are connected to form the cooling loop. The working fluid is heated in the flash injection tube by low-temperature heat source, and is cooled in the finned tube by air or water. The gravity and flash force jointly drive the flash jet natural cycle. The lower magnetic ball acts as a one-way valve for supplying liquid to the flash injection tube. The upper magnetic ball acts as a valve and a rotor driven by the flash force and gravity to move linearly and produce electricity.

8 Claims, 2 Drawing Sheets

POWER GENERATION DEVICE AND METHOD USING ORGANIC WORKING FLUID FOR CIRCULATION WITHOUT PUMP AND VALVE

CROSS REFERENCE OF RELATED APPLICATION

The present invention claims priority under 35 U.S.C. 119(a-d) to CN 202010087252.8, filed Feb. 11, 2020.

BACKGROUND OF THE PRESENT INVENTION

Field of Invention

The present invention relates to the field of low-temperature heat source power generation technology, and more particularly to a power generation device and method using organic working fluid for circulation without pump and valve, namely a flash jet natural cycle.

Description of Related Arts

Thermal energy is the most widely used form of energy in the national economy and people's lives. In recent years, many scholars have done a lot of research on the utilization of various low-temperature thermal energies. They are various industrial waste heat, solar energy, geothermal energy, biomass energy, etc., and the total amount is huge.

At present, the main utilization methods of low-temperature thermal energy are organic Rankine cycle, Kalina cycle and supercritical carbon dioxide cycle. The above methods have the problems of complex structure, low efficiency and high cost. Therefore, a new power generation device is proposed which is driven by the combination of flash force and gravity without pump and valve. It can be referred to as flash jet natural cycle.

SUMMARY OF THE PRESENT INVENTION

The present invention provides a power generation device and method using organic working fluid for circulation without pump and valve. Instead of using a working fluid pump and a turbine, the flash injection tube and the upper magnetic sphere are employed to drive the cycle and convert electricity in the power generation device provided by the present invention. Notably, the lower magnetic sphere and the upper magnetic sphere are able to replace the valves in some pumpless organic Rankine cycle. Therefore, the power generation device has advantages of simple structure, low cost and high efficiency.

Accordingly, the power generation device using organic working fluid for circulation without pump and valve comprises a flash injection tube, a magnetic sphere motion tube, a storage tank, a working fluid descent tube, a lower nozzle, a lower magnetic sphere, an upper nozzle, an upper magnetic sphere, a conical expansion part, a finned tube, a concentric outer tube, a heat source, a linear generator coil, a rectifier circuit, and a load, wherein the flash injection tube, the magnetic sphere motion tube, the conical expansion part, a lower portion of the storage tank and the working fluid descent tube are connected with each other in sequence to form a main loop; an upper portion of the storage tank, the finned tube and the lower portion of the storage tank are connected with each other for forming a cooling loop; the lower nozzle and the lower magnetic sphere are provided at a lower end of the flash injection tube, which forms a one-way valve to restrict fluid to move upwardly only; the upper nozzle and the upper magnetic sphere are provided at an upper end of the flash injection tube, which forms a flash nozzle to drive the upper magnetic sphere to move upwardly through the fluid; the upper magnetic sphere is able to move in the magnetic sphere motion tube; the flash injection tube and the concentric outer tube form a tube and shell heat exchanger; the heat source is used to provide shell side fluid of the tube and shell heat exchanger and transfer heat to tube side fluid to cause the fluid flashing; the conical expansion part is provided at an upper end of the magnetic sphere motion tube away from the flash injection tube; the linear generator coil is wound around the magnetic sphere motion tube, the linear generator coil is connected with the rectifier circuit, the rectifier circuit is connected with the load; the upper magnetic sphere, the magnetic sphere motion tube, the linear generator coil and the rectifier circuit form a linear generator.

Preferably, the main loop is filled with the organic working fluid with low boiling point.

Preferably, both the lower nozzle and the upper nozzle are converging-diverging nozzles.

Preferably, both the upper magnetic sphere and the lower magnetic sphere are neodymium iron boron magnetic spheres.

Preferably, a diameter of the lower magnetic sphere and the upper magnetic sphere is smaller than an inner diameter of the flash injection tube and the magnetic sphere motion tube, respectively.

Preferably, the finned tube is used for condensation of the working fluid by the method of air cooling or water cooling.

Also, a power generation method of the power generation device using organic working fluid for circulation without pump and valve is provided, the power generation method, namely a flash jet natural cycle, comprises the steps of:

increasing temperature and pressure of a part of the working fluid in the flash injection tube by heating the flash injection tube with the heat source, the part of the working fluid in the flash injection tube pushing away the upper magnetic sphere when the pressure overcomes gravity of the upper magnetic sphere and a part of the working fluid in the magnetic sphere motion tube, wherein the pressure of the part of the working fluid in the flash injection tube suddenly drops; simultaneously, the part of the working fluid in the flash injection tube experiences a quasi-isothermal rapid expansion process and quickly approaches initial pressure of the power generation device;

since the initial pressure of the power generation device is lower than saturated steam pressure of the part of the working fluid in the flash injection tube after heated, the part of the working fluid in the flash injection tube will gradually overheat; the superheated working fluid undergoing a phase transition and producing a large number of bubble nucleus, resulting in rapid gasification, that is, producing a lot of bubbles, namely flashing;

the bubbles expanding rapidly till bursting, wherein the expansion and bursting process produces a strong flash force, ejecting the upper magnetic sphere upwardly under an action of the flash force; the upper magnetic sphere moving upwardly in the magnetic sphere motion tube, wherein in order to control a motion height of the upper magnetic sphere, the conical expansion part is provided at an upper end of the magnetic sphere motion tube away from the flash injection tube; wherein after driving the upper magnetic sphere to move upwardly, the part of the working fluid in the flash injection tube undergoes a spontaneous process from a quasi-steady state to a steady state, which is from formation and growth of the bubble nucleus to a gas-liquid two-phase state;

the upper magnetic sphere falling back to an initial position under an action of gravity since a cross section from the magnetic sphere motion tube to the conical expansion part is increased and the steam rises up and flows to the storage tank, a velocity of the part of the working fluid in the magnetic sphere motion tube is decreased, a thrust applied to the upper magnetic sphere is decreased, wherein during above steps, the lower magnetic sphere acts as a one-way valve for completely applying a flash force of the part of the working fluid in the flash injection tube to drive the upper magnetic sphere to move upwardly and allowing a part of the working fluid in the storage tank entering the flash injection tube again;

after gas-liquid mixture in the part of the working fluid in the flash injection tube entering the storage tank, gas-phase separation taking place; since a density of gas-phase working fluid is smaller than a density of liquid-phase working fluid, the gas-phase working fluid flowing towards an upper portion of the storage tank, dissipating heat through the finned tube, condensed fluid flowing back to the storage tank, flowing into the flash injection tube again under an action of gravity, and starting a new cycle;

wherein linear reciprocating movement of the upper magnetic sphere causes a magnetic flux change in the linear generator coil; according to Faraday's law of electromagnetic induction, an induced current in the linear generator coil is produced and is able to be used by the load after modulated by the rectifier circuit.

The power generation method for low-temperature heat energy, provided by the present invention, has innovations as follows.

(1) Compared with the traditional organic Rankine cycle (ORC) power generation system, the power generation device provided by the present invention adopts natural circulation in the main loop and cooling loop, replaces the booster pump of ORC power generation system with the flash injection tube which reduces the power consumption of the pump. What's more, the upper magnetic sphere and the magnetic sphere motion tube replace the expander which avoids the sealing problem.

(2) Compared with the pumpless ORC power generation system, the upper and lower magnetic spheres arranged at the upper and lower ends of the flash injection tube in the present invention play the same role as the valves installed before the evaporator and the expander.

(3) Compared with the usual power generator device, the upper magnetic sphere and the magnetic sphere motion tube are like the mover and stator of linear generator, which replace the indispensable electric generator.

Due to the special design, the power generation device provided by the present invention has advantages of high efficiency, simple structure and low cost. It is able to be used in the fields such as small generators, distributed power generation systems, and low-temperature industrial waste heat recovery.

BRIEF DESCRIPTION OF THE DRAWINGS

In FIG. 3a, a part of the working fluid in the flash injection tube is in the initial state; in FIGS. 3b and 3b', the part of the working fluid in the flash injection tube is heated by the heat source and the pressure is slightly greater than the gravity of the upper magnetic sphere and a part of the working fluid in the magnetic sphere motion tube; FIG. 3c shows the state of the part of the working fluid flashing in the flash injection tube and pushing the upper magnetic ball to move upward; FIG. 3d shows the state of the upper magnetic sphere falling back to its original position under the action of gravity.

Figure 1:
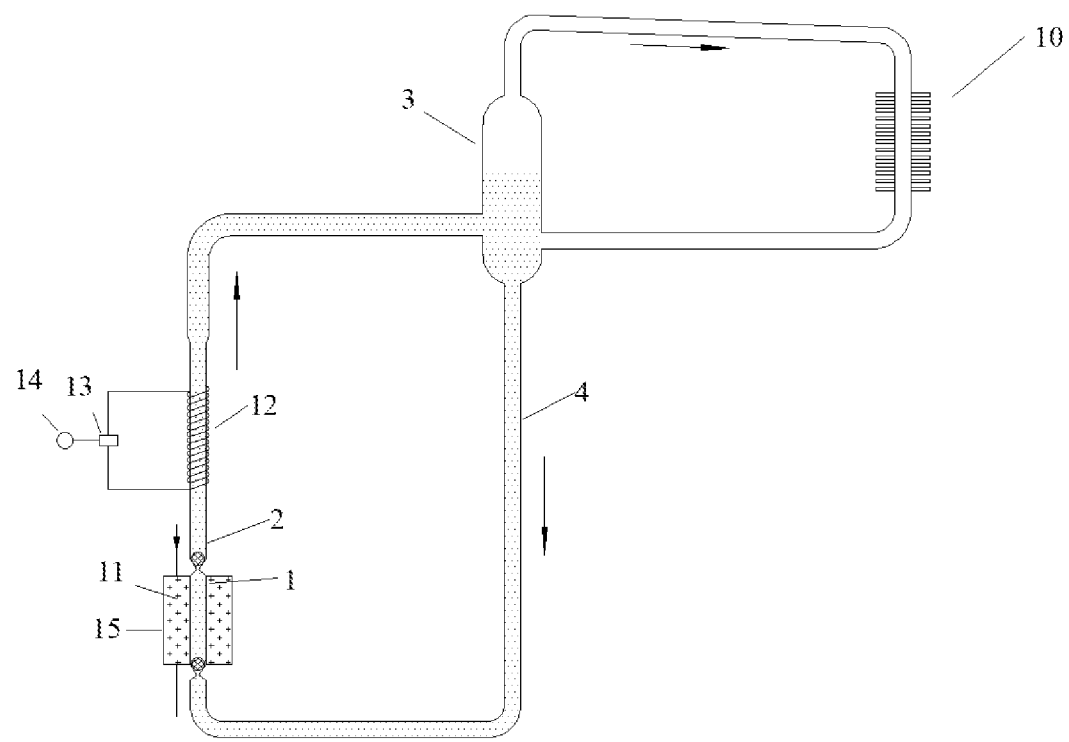
FIG. 1 is a structurally schematic view of a power generation device provided by the present invention.

In the drawings, 1: flash injection tube; 2: magnetic sphere motion tube; 3: storage tank; 4: working fluid descent tube; 5: lower nozzle; 6: lower magnetic sphere; 7: upper nozzle; 8: upper magnetic sphere; 9: conical expansion part; 10: finned tube; 11: heat source; 12: linear generator coil; 13: rectifier circuit; 14: load; 15: concentric outer tube.

DETAILED DESCRIPTION OF THE PREFERRED EMBODIMENT

The present invention is explained with accompanying drawings in detail as follows.

Figure 2:
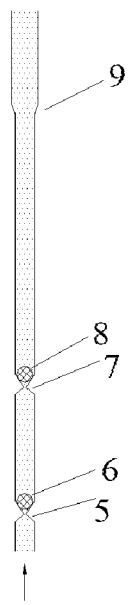
FIG. 2 is an enlarged view of a flash injection tube and a magnetic sphere motion tube of the power generation device.

Referring to FIGS. 1 and 2, a power generation device using organic working fluid for circulation without pump and valve according to a preferred embodiment of the present invention is illustrated, which comprises a flash injection tube 1, a magnetic sphere motion tube 2, a storage tank 3, a working fluid descent tube 4, a lower nozzle 5, a lower magnetic sphere 6, an upper nozzle 7, an upper magnetic sphere 8, a conical expansion part 9, a finned tube 10, a heat source 11, a linear generator coil 12, a rectifier circuit 13, a load 14 and a concentric outer tube 15, wherein the flash injection tube 1, the magnetic sphere motion tube 2, the conical expansion part 9, a lower portion of the storage tank 3 and the working fluid descent tube 4 are connected with each other in sequence to form a main loop; an upper portion of the storage tank 3, the finned tube 10 and the lower portion of the storage tank 3 are connected with each other to form a cooling loop; the lower nozzle 5 and the lower magnetic sphere 6 are provided at a lower end of the flash injection tube 1, which forms a one-way valve to restrict fluid to move upwardly only; the upper nozzle 7 and the upper magnetic sphere 8 are provided at an upper end of the flash injection tube 1, which forms a flash nozzle to drive the upper magnetic sphere 8 to move upwardly through the fluid; the upper magnetic sphere 8 is able to move in the magnetic sphere motion tube 2; the flash injection tube 1 and the concentric outer tube 15 form a tube and shell heat exchanger; the heat source 11 is used to provide shell side fluid of the tube and shell heat exchanger and transfer heat to tube side fluid to cause the fluid flashing; the conical expansion part 9 is provided at an upper end of the magnetic sphere motion tube 2 away from the flash injection tube 1; the linear generator coil 12 is wound around the magnetic sphere motion tube 2, the linear generator coil 12 is connected with the rectifier circuit 13, the rectifier circuit 13 is connected with the load 14; the upper magnetic sphere 8, the magnetic sphere motion tube 2, the linear generator coil 12 and the rectifier circuit 13 form a linear generator.

Preferably, the main loop is filled with the organic working fluid with low boiling point which is generally Freon working fluid and Alkane working fluid, such as R124, R245fa, R134a, R600a and N-pentane. These working fluids have a critical temperature in a range of 100° C. to 200° C. and a critical pressure in a range of 3.5 MPa to 4.1 MPa, which matches the heat source of the power generation device in temperature to perform conversion of heat-into-power at low temperature, and the organic working fluid has low requirement on the pressure bearing capacity of the power generation device. Moreover, the organic working fluid has characteristics of low latent heat and high density, which reduces the irreversible loss in the thermal process and makes the structure of the device more compact. From the perspective of safety performance, system efficiency, and economic performance, the organic working fluid has better thermodynamic and environmental protection characteristics than commonly used natural substances such as $NH_3$ and $CO_2$.

Preferably, both the lower nozzle and the upper nozzle are converging-diverging nozzles. The working fluid evaporates from a saturated liquid state to a gas-liquid two-phase state while flowing through the throat of the converging-diverging nozzle. The process of evaporating is different from the traditional organic Rankine cycle, in which the working fluid evaporates from the saturated liquid state to a saturated or superheated steam state. The process in the flash jet natural cycle avoids the isothermal boiling process, so that heat is more effectively transferred from the heat source to the working fluid and irreversible loss is reduced.

Preferably, both the upper magnetic sphere 8 and the lower magnetic sphere 6 are neodymium iron boron magnetic spheres, whose working temperature is up to 200° C., texture is hard, performance is stable, and cost performance is very good. Neodymium iron boron magnetic materials make the components more compact and reduce the scale of the device. At the same time, under the condition of the same geometric size, the stronger the magnetic field strength, the higher the efficiency of the power generation device.

Preferably, the finned tube 10 increases heat exchange by increasing the heat exchange area, so that the heat exchange efficiency is increased. It is able to be cooled by air or water.

As shown in FIGS. 1 and 2, after a part of the working fluid in the flash injection tube 1 is heated by the heat source 11, the temperature and the pressure of the part of the working fluid in the flash injection tube 1 are gradually increased; the part of the working fluid in the flash injection tube 1 pushes away the upper magnetic sphere 8 when the pressure overcomes gravity of the upper magnetic sphere 8 and a part of the working fluid in the magnetic sphere motion tube, wherein the pressure of the part of the working fluid in the flash injection tube 1 suddenly drops; the flash occurs, resulting in the gas-liquid two-phase flow; the volume of the gas-phase working fluid expands, and a jet stream is formed through the upper nozzle 7 for driving the upper magnetic sphere 8 to move upwardly. When the upper magnetic sphere 8 moves to the conical expansion part 9, the flow rate of the part of the working fluid in the magnetic sphere motion tube is decreased, and an upward thrust applied to the upper magnetic sphere 8 is decreased, and then the upper magnetic sphere 8 falls back to the original position under the action of gravity. The working fluid that drives the upper magnetic sphere 8 to move flows into the storage tank 3; after being condensed through the finned tube 10, the gas-phase fluid flows back to the storage tank 3, and then flows back to the flash injection tube 1 again together with the liquid-phase fluid for starting the next cycle. In each cycle, the upper magnetic sphere 8 reciprocates linearly for cutting the linear generator coil 12 to generate an induced current. The power generation device provided by the present invention is able to convert the thermal energy of low-temperature heat source into electric energy through the linear generator coil.

Figures 3A, 3B, 3C, 3D:
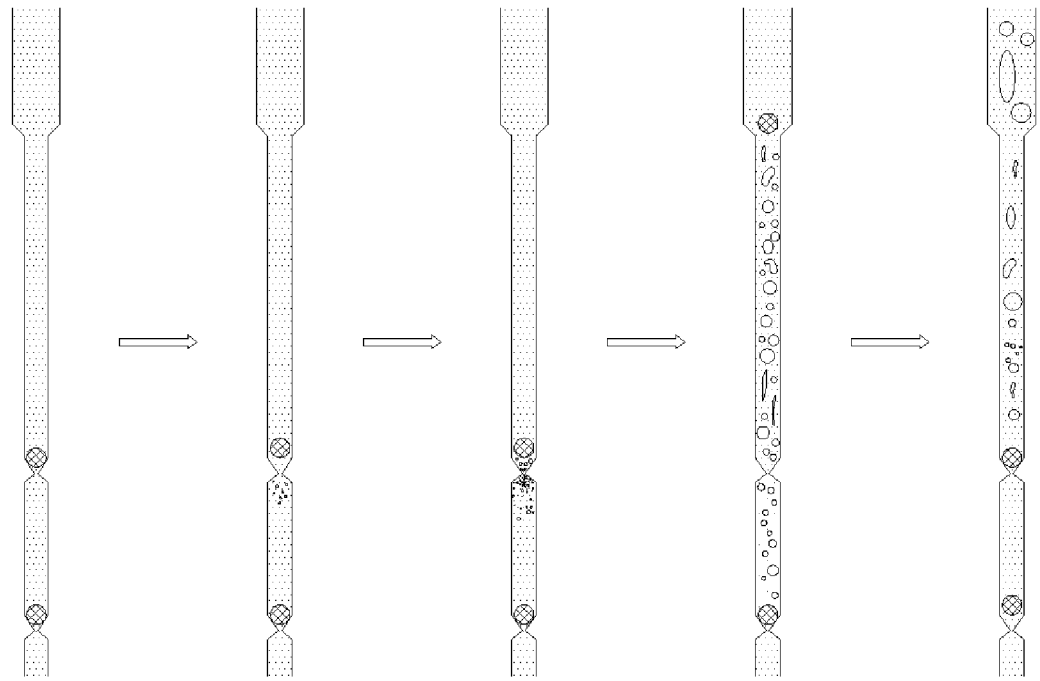
FIGS. 3a-3d are schematic diagrams of formation and growth of bubbles in the flash injection tube.

A working process of the power generation device using organic working fluid for circulation without pump and valve comprises the steps of:

(1) vacuumizing the main loop and filling the main loop with the organic working fluid, wherein in an initial state, as shown in FIG. 3a, the working fluid is in a saturated liquid state at room temperature;

(2) starting heating, wherein the lower nozzle 5 and the upper nozzle 7 are respectively installed at a lower end and an upper end of the flash injection tube 1, the lower magnetic sphere 6 and the upper magnetic sphere 8 are respectively located at the lower nozzle 5 and the upper nozzle 7, so as to form a relatively constant volume;

(3) increasing temperature and pressure of a part of the working fluid in the flash injection tube with the heat source 11 during heating; the part of the working fluid in the flash injection tube 1 pushing away the upper magnetic sphere 8 when the pressure overcomes gravity of the upper magnetic sphere 8 and a part of the working fluid in the magnetic sphere motion tube 2, as shown in FIG. 3b, wherein pressure of the part of the working fluid in the flash injection tube 1 suddenly drops below the saturation pressure and a small amount of bubble nucleus are generated;

(4) in a very short (millisecond) time, the overheated working fluid undergoing a phase transition and producing a large number of bubbles, resulting in rapid gasification, as shown in FIG. 3b';

(5) the bubbles expanding rapidly until bursting, wherein the expansion and bursting process (flashing) produces a strong flash force to push the upper magnetic sphere 8 to eject upwardly, as shown in FIG. 3c;

(6) the upper magnetic sphere falling back to an initial position under an action of gravity when a velocity of the part of the working fluid in the magnetic sphere motion tube 2 is decreased through the conical expansion part 9 and the gas-phase rises up and flows to the storage tank, wherein the conical expansion part 9 is provided at the upper end of the magnetic sphere motion tube 2 away from the flash injection tube 1, which avoids the upper magnetic sphere 8 flowing into the storage tank 3 with the working fluid; during the process of the upper magnetic sphere falling back, the working fluid in the main loop flows into the flash injection tube 1 from the storage tank 3 again under the action of gravity; and at the same time, the lower magnetic sphere 6 acts as a one-way valve and is pushed upwardly by the action of the working fluid, as shown in FIG. 3d; and (7) when the flash injection tube 1 is filled with the saturated liquid at room temperature, repeating the steps (3) to (6).

Figure 4:
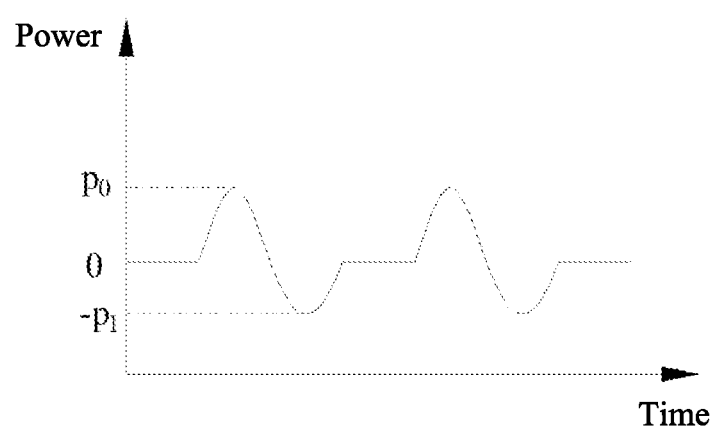
FIG. 4 is a schematic diagram of the relationship between generated power and time of the power generation device provided by the present invention.

The steps of (3) to (7) is defined as a complete cycle of the power generation device. As the upper magnetic sphere 8 reciprocates linearly each time, a pulsed current is generated in the linear generator coil 12, as shown in FIG. 4.

What is claimed is:

1. A power generation device using organic working fluid for circulation without pump and valve, the device comprising a flash injection tube (1), a magnetic sphere motion tube (2), a storage tank (3), a working fluid descent tube (4), a lower nozzle (5), a lower magnetic sphere (6), an upper nozzle (7), an upper magnetic sphere (8), a conical expansion part (9), a finned tube (10), a heat source (11), a linear generator coil (12), a rectifier circuit (13), a load (14) and a concentric outer tube (15), wherein the flash injection tube (1), the magnetic sphere motion tube (2), the conical expansion part (9), a lower portion of the storage tank (3) and the working fluid descent tube (4) are connected with each other in sequence to form a main loop; an upper portion of the storage tank (3), the finned tube (10) and the lower portion of the storage tank (3) are connected with each other to form a cooling loop; the lower nozzle (5) and the lower magnetic sphere (6) are provided at a lower end of the flash injection tube (1), which forms a one-way valve to restrict fluid to move upwardly only; the upper nozzle (7) and the upper magnetic sphere (8) are provided at an upper end of the flash injection tube (1), which forms a flash nozzle to drive the upper magnetic sphere (8) to move upwardly through the fluid; the upper magnetic sphere (8) is able to move in the magnetic sphere motion tube (2); the flash injection tube (1) and the concentric outer tube (15) form a tube and shell heat exchanger; the heat source (11) is used to provide shell side fluid of the tube and shell heat exchanger and transfer heat to tube side fluid to cause fluid flashing; the conical expansion part (9) is provided at an upper end of the magnetic sphere motion tube (2) away from the flash injection tube (1); the linear generator coil (12) is wound around the magnetic sphere motion tube (2), the linear generator coil (12) is connected with the rectifier circuit (13), the rectifier circuit (13) is connected with the load (14); the upper magnetic sphere (8), the magnetic sphere motion tube (2), the linear generator coil (12) and the rectifier circuit (13) form a linear generator.

2. The power generation device according to claim 1, wherein the main loop is filled with the organic working fluid with low boiling point.

3. The power generation device according to claim 1, wherein both the lower nozzle (5) and the upper nozzle (7) are converging-diverging nozzles.

4. The power generation device according to claim 1, wherein both the upper magnetic sphere (8) and the lower magnetic sphere (6) are neodymium iron boron magnetic spheres.

5. The power generation device according to claim 1, wherein a diameter of the lower magnetic sphere (6) and the upper magnetic sphere (8) is smaller than an inner diameter of the flash injection tube (1) and the magnetic sphere motion tube (2), respectively.

6. The power generation device according to claim 1, wherein the finned tube (10) is an enhanced heat transfer tube and is able to be cooled by air or water.

7. The power generation device according to claim 1, wherein the flash injection tube (1) and the magnetic sphere motion tube (2) are able to be extended to multiple parallel tubes.

8. A power generation method of the power generation device using organic working liquid for circulation without pump and valve according to claim 1, wherein the method comprises the steps of:

increasing temperature and pressure of a part of the working fluid in the flash injection tube (1) by heating the flash injection tube (1) with the heat source (11), the part of the working fluid in the flash injection tube (1) pushing away the upper magnetic sphere (8) when the pressure overcomes gravity of the upper magnetic sphere (8) and a part of the working fluid in the magnetic sphere motion tube (2), wherein the pressure of the part of the working fluid in the flash injection tube (1) suddenly drops; simultaneously, the part of the working fluid in the flash injection tube (1) experiences a quasi-isothermal rapid expansion process and quickly approaches an initial pressure of the power generation device;

since the initial pressure of the power generation device is lower than saturated steam pressure of the part of the working fluid in the flash injection tube after being heated, the part of the working fluid in the flash injection tube will gradually overheat; the overheated working fluid undergoing a phase transition and producing a large number of bubble nucleus, resulting in rapid gasification, and producing a lot of bubbles;

the bubbles expanding rapidly until bursting, wherein the expansion and bursting process produces a flash force, ejecting the upper magnetic sphere (8) upwardly under an action of the flash force; the upper magnetic sphere (8) moving upwardly in the magnetic sphere motion tube (2), wherein in order to control a motion height of the upper magnetic sphere (8), the conical expansion part (9) is provided at an upper end of the magnetic sphere motion tube (2) away from the flash injection tube (1);

the upper magnetic sphere (8) falling back to an initial position under an action of gravity since a cross section from the magnetic sphere motion tube (2) to the conical expansion part (9) is increased and steam rises up and flows to the storage tank, a velocity of the part of the working fluid in the magnetic sphere motion tube is decreased, a thrust applied to the upper magnetic sphere (8) is decreased, wherein during above steps, the lower magnetic sphere (6) acts as a one-way valve for completely applying the flash force of the part of the working fluid in the flash injection tube to drive the upper magnetic sphere (8) to move upwardly and allowing a part of the working fluid in the storage tank entering the flash injection tube again;

after gas-liquid mixture in the part of the working fluid in the flash injection tube entering the storage tank, gas-phase separation taking place; since a density of gas-phase working fluid is smaller than a density of liquid-phase working fluid, the gas-phase working fluid flowing towards an upper portion of the storage tank, dissipating heat through the finned tube (10), condensed fluid flowing back to the storage tank (3), flowing into the flash injection tube (1) under an action of gravity, and starting a new cycle, wherein linear reciprocating movement of the upper magnetic sphere (8) causes a magnetic flux change in the linear generator coil (12); according to Faraday's law of electromagnetic induction, an induced current in the linear generator coil is produced and is able to be used by the load after modulated by the rectifier circuit.

* * * * *